(12) United States Patent
Kuan et al.

(10) Patent No.: US 11,295,031 B2
(45) Date of Patent: *Apr. 5, 2022

(54) EVENT LOG TAMPER RESISTANCE

(71) Applicant: INTERNATIONAL BUSINESS MACHINES CORPORATION, Armonk, NY (US)

(72) Inventors: Michael Kuan, Poughkeepsie, NY (US); Scott Ballentine, Poughkeepsie, NY (US); Anthony Thomas Sofia, Hopewell-Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/595,563

(22) Filed: Oct. 8, 2019

(65) Prior Publication Data

US 2021/0103674 A1    Apr. 8, 2021

(51) Int. Cl.
*G06F 21/62* (2013.01)
*G06F 21/88* (2013.01)
(Continued)

(52) U.S. Cl.
CPC ........ *G06F 21/6227* (2013.01); *G06F 21/602* (2013.01); *G06F 21/64* (2013.01); *G06F 21/88* (2013.01)

(58) Field of Classification Search
CPC ...... G06F 21/6227; G06F 21/88; G06F 21/64; G06F 21/602; G06F 2221/2101; G06F 2221/2151
See application file for complete search history.

(56) References Cited

U.S. PATENT DOCUMENTS 6,532,121 B1    3/2003    Rust et al.
6,816,957 B1    11/2004   Halladay et al.
(Continued)

FOREIGN PATENT DOCUMENTS

CN    101692239 B    10/2012
CN    103795811 B    5/2015
(Continued)

OTHER PUBLICATIONS

IBM, "z/Architecture Principles of Operation," IBM® Publication No. SA22-7832-10, Eleventh Edition, Mar. 2015, pp. 1-1732. Due to Size Constraints this document is uploaded in 5 parts.
(Continued)

*Primary Examiner* — Cheng-Feng Huang
(74) *Attorney, Agent, or Firm* — Cantor Colburn LLP; Teddi Maranzano

(57) ABSTRACT

Embodiments are described for generating, by the processor, a first event record in response to an event being performed by the computer and generating, by the processor, a first tamper resistance record in response to the first event record being generated. The first tamper resistance record includes a first signature is created based at least in part on the first event record and a second signature is created based at least in part on the first event record. Aspects also includes validating the first event record based on the first signature and the second signature in the first tamper resistance record in response to a request to detect tampering of the first event record.

16 Claims, 7 Drawing Sheets

(51) Int. Cl.
    *G06F 21/64*         (2013.01)
    *G06F 21/60*         (2013.01)

(56) References Cited

U.S. PATENT DOCUMENTS

| | | | |
|---|---|---|---|
| 8,879,728 B2 | 11/2014 | Macmillan et al. | |
| 8,943,332 B2 | 1/2015 | Horne et al. | |
| 9,471,119 B2 | 10/2016 | Dayka et al. | |
| 2005/0071436 A1 | 3/2005 | Hsu et al. | |
| 2005/0232421 A1* | 10/2005 | Simons | H04L 63/126 380/255 |
| 2009/0327732 A1* | 12/2009 | Buhler | H04L 9/3234 713/176 |
| 2011/0145593 A1* | 6/2011 | Auradkar | H04L 9/006 713/189 |
| 2015/0121081 A1 | 4/2015 | Dayka et al. | |
| 2016/0171205 A1* | 6/2016 | Bauer | G06F 21/64 726/26 |
| 2016/0210450 A1* | 7/2016 | Su | H04L 63/10 |
| 2016/0301704 A1* | 10/2016 | Hassanzadeh | H04L 63/1433 |
| 2016/0364463 A1 | 12/2016 | Chen et al. | |
| 2017/0032148 A1* | 2/2017 | Sofia | G06F 21/88 |
| 2017/0041296 A1* | 2/2017 | Ford | G06F 16/951 |
| 2017/0103167 A1 | 4/2017 | Shah | |
| 2017/0344474 A1 | 11/2017 | Zhou et al. | |
| 2018/0075257 A1 | 3/2018 | Sofia et al. | |
| 2018/0077184 A1* | 3/2018 | Thom | H04L 63/126 |
| 2019/0207759 A1 | 7/2019 | Chan et al. | |
| 2019/0207767 A1 | 7/2019 | Ahn | |
| 2019/0236302 A1 | 8/2019 | Czerkowicz et al. | |
| 2019/0236316 A1 | 8/2019 | Watkins et al. | |
| 2019/0245682 A1* | 8/2019 | Alwen | H04L 9/16 |
| 2019/0289019 A1* | 9/2019 | Thekadath | H04L 9/3239 |
| 2020/0004577 A1 | 1/2020 | Parkinson et al. | |
| 2020/0349121 A1 | 11/2020 | Lee et al. | |
| 2021/0132829 A1 | 5/2021 | Zhao et al. | |

FOREIGN PATENT DOCUMENTS

| | | |
|---|---|---|
| CN | 102821138 B | 6/2015 |
| CN | 106682530 A | 5/2017 |
| CN | 104331478 B | 9/2017 |

OTHER PUBLICATIONS

Transmittal Form PTO/SB/21, filed Mar. 16, 2020.
IBM "List of IBM Patents or Patent Afflictions Treated as Related"; (Appendix P), Date filed Feb. 13, 2020; 2 pages.
Ordonez, Bonnie Michele et al., Pending U.S. Non-Provisional Application Entitled: "Ordering Records for Timed Meta-Data Generation in a Blocked Record Environment"; U.S. Appl. No. 16/789,469; filed Feb. 13, 2020.
International Search Report and Written Opinion for International Application No. PCT/IB2020/058764; dated Jan. 15, 2021; 9 pgs.

* cited by examiner

EVENT LOG TAMPER RESISTANCE

BACKGROUND

The present application relates to protecting records created by an event logger, and more specifically, to protecting records created by an existing event logger without affecting an event log processing infrastructure.

In systems such as a server, an event logger may record an event record corresponding to an event, such as a system event associated with an operation of the server. Enterprises may audit such logged event records as part of regulatory compliance. For compliance, the audit may have to verify that contents of the event record have remained unmodified or that any changes have been tracked.

SUMMARY

The examples described throughout the present application provide technical solutions to technical problems regarding tamper resistance in existing event logging systems to facilitate an enterprise to preserve existing workflows and systems that use existing log data that contain the event records. The provided technical solutions improve the functionality of the event logging systems.

An aspect includes a computer implemented method for securing a log of one or more events by adding tamper resistance to the log. The method includes generating, by the processor, a first event record in response to an event being performed by the computer and generating, by the processor, a first tamper resistance record in response to the first event record being generated. The first tamper resistance record includes a first signature is created based at least in part on the first event record and a second signature is created based at least in part on the first event record. The method also includes validating the first event record based on the first signature and the second signature in the first tamper resistance record in response to a request to detect tampering of the first event record.

Another aspect includes a system including a memory and a processor. The processor is operable to generate a first event record in response to an event being performed by the computer and to generate a first tamper resistance record in response to the first event record being generated. The first tamper resistance record includes a first signature is created based at least in part on the first event record and a second signature is created based at least in part on the first event record. The processor is also operable to validate the first event record based on the first signature and the second signature in the first tamper resistance record in response to a request to detect tampering of the first event record.

Another aspect includes a computer program product including a non-transitory computer readable storage medium having program instructions embodied therewith, the program instructions being executable by a processor to cause the processor to perform a method. The method includes generating a first event record in response to an event being performed by the computer and generating a first tamper resistance record in response to the first event record being generated. The first tamper resistance record includes a first signature is created based at least in part on the first event record and a second signature is created based at least in part on the first event record. The method also includes validating the first event record based on the first signature and the second signature in the first tamper resistance record in response to a request to detect tampering of the first event record.

BRIEF DESCRIPTION OF THE DRAWINGS

The examples may be better understood with reference to the following figures and description. The components in the figures are not necessarily to scale. Moreover, in the figures, like-referenced numerals designate corresponding parts throughout the different views.

Additional features and advantages are realized through the techniques of the technical solutions, examples, and aspects of which, are described in detail herein.

DETAILED DESCRIPTION

Techniques to enhance existing event logging systems by additional functionality of tamper resistance while preserving existing workflows that use log data generated by the event logging systems are described. The examples described throughout the document facilitate tamper resistance of the log data without modifying the log data generated. The tamper resistance data generated for an event record is stored as another event record and the tamper resistance data include multiple signatures. To audit whether the event record has been tampered with, the contents of the event record may be compared with the other record. The other record may be bypassed during other operations. Accordingly, an existing event logging system may be improved to provide tamper resistance for regulatory compliance without incurring costs to modify workflows that use the existing workflows. In addition, the security level of the event logging system can be increased by using multiple different signatures in the tamper resistance records. In exemplary embodiments, the event logging system is configured to manage signature data, including additional metadata associated with each signature and differing payload included in each signature. In addition, the event logging system is configured to dynamically enable or disable individual signatures for data being added to the event log while preserving the ability to verify the signed data using unaffected signatures.

Figure 1:
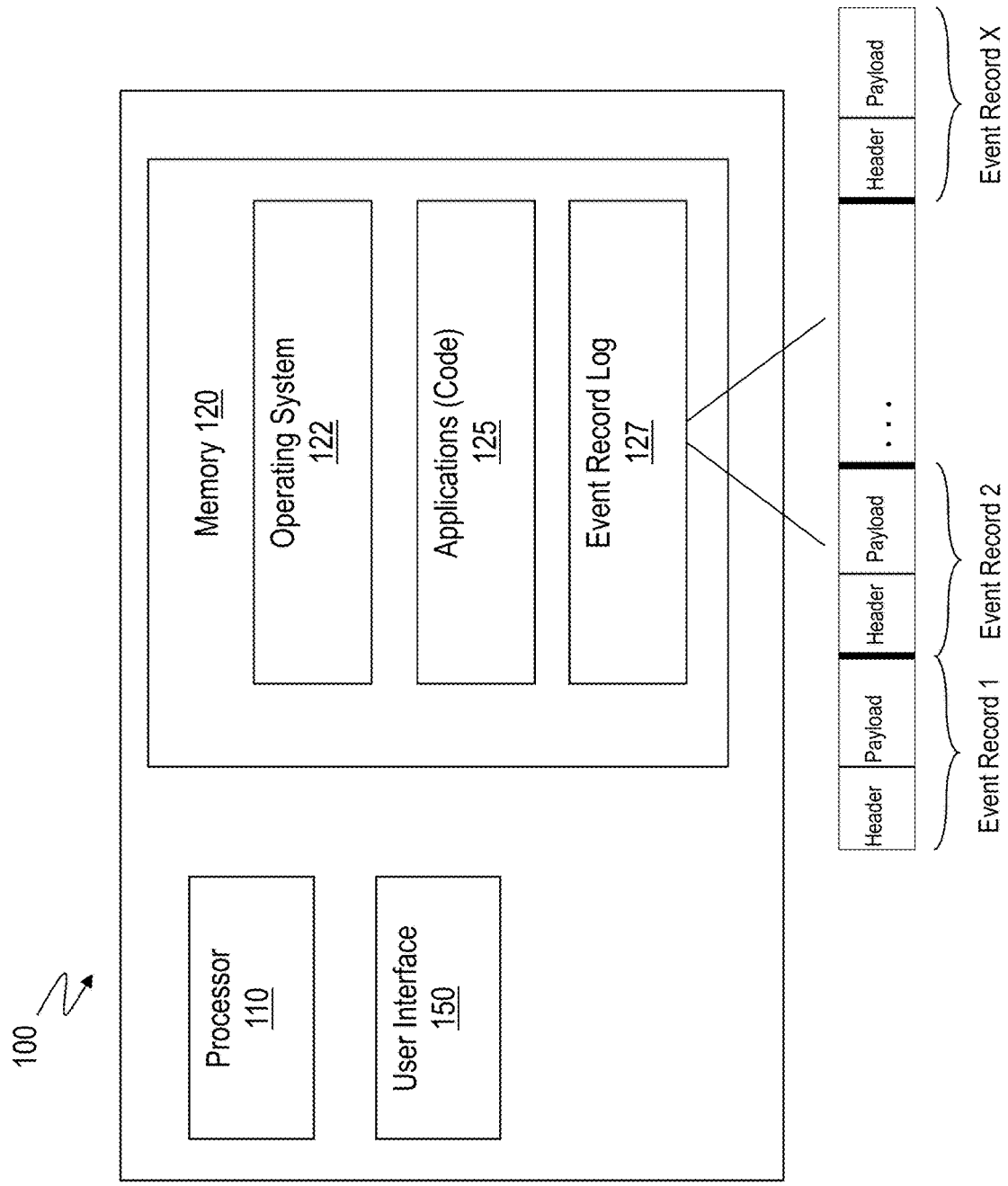
FIG. 1 illustrates a system for use in practicing the teachings herein.

FIG. 1 illustrates an example system 100. The system 100 may be a computer such as a server computer or the like. The system 100 may include, among other components, a processor 110, a memory 120, a user interface 150, and a communication interface 170.

The processor 110 may be a central processor of the system 100 responsible for execution of an operating system, control instructions, and applications installed on the system 100. The processor 110 may be one or more devices operable to execute logic. The logic may include computer executable instructions or computer code embodied in the memory 120 or in other memory that when executed by the processor 110, cause the processor 110 to perform the features implemented by the logic. The computer code may include instructions executable with the processor 110. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 110 may be a general processor, central processing unit, server, application specific integrated circuit (ASIC), digital signal processor, field programmable gate array (FPGA), digital circuit, analog circuit, or combinations thereof. The processor 110 may be in communication with the memory 120 and other components of the system 100. In one example, the processor 110 may also be in communication with additional elements, such as the user interface 150 and the communication interface 170.

The memory 120 may be non-transitory computer storage medium. The memory 120 may be DRAM, SRAM, Flash or any other type of memory or a combination thereof. The memory 120 may store an operating system 122 and applications 125 that are executable by the processor 110. The operating system 122 and the applications 125 may be stored on the memory 120 by the manufacturer, provider, or end-user of the system 100. The memory 120 may contain other data such as images, videos, documents, spreadsheets, audio files, and other data that may be associated with operation of the system 100. For example, the memory 120 may be used to store an event record log 127.

The user interface 150 may include a display, a speaker, a keyboard, a mouse, or any other component that facilitates user interaction. The display may be touch screen enabled. The user interface 150 may, alternatively, or in addition, a microphone or any other component that may facilitate user interaction. The user interface 150 may be circuitry, such as processor, memory, communication interfaces, integrated circuits, antennas, resistors, capacitors, and any other hardware components. The user interface 150 may also involve software. For example, the user interface 130 may include instructions and/or data that may be stored on memory. The instructions and/or data may control operations of the user interface 150. The instructions may be computer executable. The data may include parameters and/or preset conditions associated with the user interface 150.

The event record log 127 includes one or more event records 130a-130x. An event record is a data record describing an operation of the system 100. The operating system 122, using the processor 110, records the event record in response to the operation being initiated and/or completed. For example, the event may be a startup event of the system 100, a file creation event, a file copy event, a user login event, or any other event that the operating system 122 may detect. The operating system 122 may be configured to detect a predetermined type of events. For example, the operating system 122 may be configured to detect 'file' type events such as a file creation event, a file copy event, a file move event, a file deletion event, a file modification event, or any other file event. In addition or alternatively, the operating system 122 may be configured to detect 'user' type events such as a user login event, a user logout event, a user profile change event and other user events. Other event types are possible and above are just a few examples.

The event record is stored using a predetermined format. For example, the event record may include a header and a payload. The payload includes a description of the corresponding event. For example, if the corresponding event is a file event, the payload includes a file identification, a file location, an indication of the operation performed, and other information describing the event. In exemplary embodiments, the header includes metadata that describes the payload, such as a length of the payload, a timestamp, or the like. The event record may be a file. Alternatively, the event record may be an entry within a file or a stream, such as a log stream.

The event record log 127 is used to validate the operation of the system 100. For example, the operating system 122 may include a System Management Facilities (SMF). The SMF Enterprises may use the event record log 127 to show regulatory compliance. For example, to be compliant, the system 100 may have to perform operations in a predetermined manner. The SMF facilitates querying the event record log 127, such as via an Application Programming Interface (API), to ensure that the system 100 was complaint with the predetermined manner of operations. In this regard, the SMF or a system auditor operates according to the predetermined format of the event record. Hence, modifying the predetermined format may cause the system auditor and the SMF to cease from current operations.

Regulatory compliance may make it vital for the SMF to ensure that the event records in the event record log 127 have not been tampered with. Addition of such tamper resistance record, as described in this document, may cause the SMF and system auditor to be modified, thus leading to additional costs. The examples described throughout the present document provide technical solutions to this technical problem.

Figure 2:
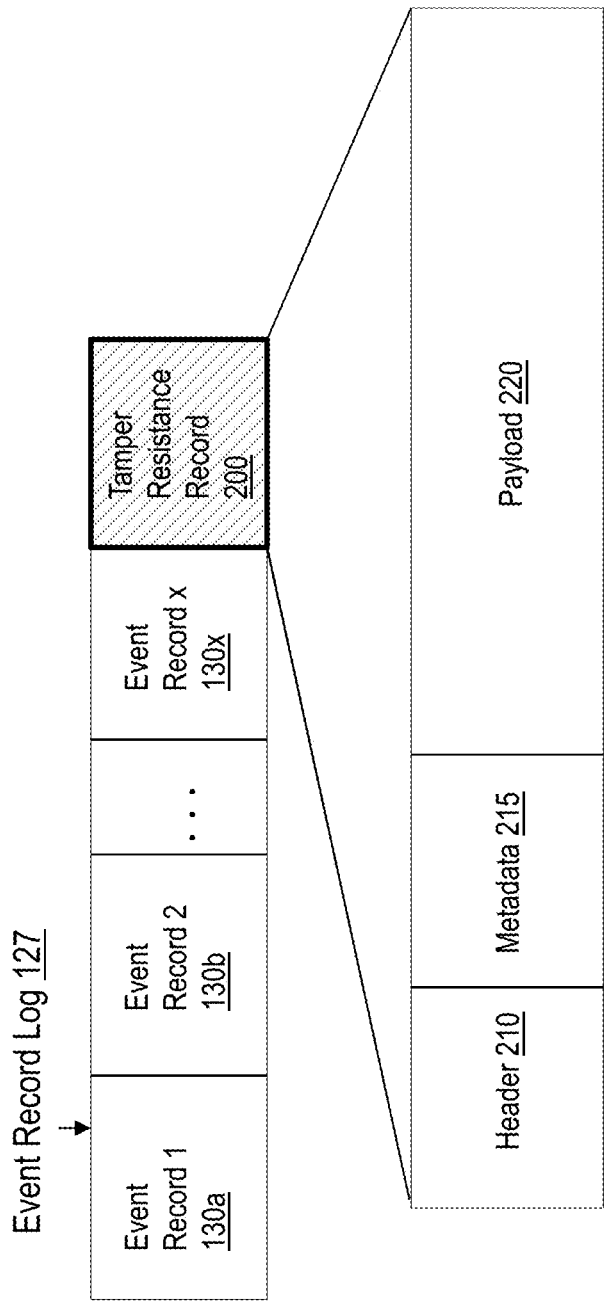
FIG. 2 illustrates an event record log including a tamper resistance record in accordance with an embodiment.

FIG. 2 illustrates an example event record log 127 including a tamper resistance record 200. For example, the processor 110 may generate the event record 130a. In response, the operating system 122 may additionally generate a metadata that includes tamper resistance information for the event record 130a. The operating system 122 may record, or format the tamper resistance information as a separate event record, referred to as the tamper resistance record 200 in the present document. The operating system 122 may subsequently record the tamper resistance record 200 in the event record log 127. Thus, the processor may insert a separate record in the event record log that contains the tamper resistance information of the event record 130a. The tamper resistance record 200 may use the same predetermined format of the event records.

For example, as shown in FIG. 2, the tamper resistance record 200 includes a header 210, metadata 215 and a payload 220. In exemplary embodiments, the payload 220 includes at least two digital signatures for the corresponding event record 130a. The digital signatures demonstrate the authenticity of the corresponding event record 130a. In an example, the digital signatures are encrypted such as using asymmetric cryptography or any other type of encryption techniques. For example, each digital signature may be based on contents of the event record 130a, a private key, a public key, a timestamp, or other information of the event associated with the event record 130a. In an example, the contents of the event record 130a may be hashed, such as using a hashing scheme prior to encryption. To validate the event record 130a, the operating system 122 decrypts the digital signatures in the payload 220 and compare the extracted data with the contents of the event record 130a. The header 210 includes a length of the payload 220 or a timestamp. The metadata 215 includes an identifier that indicates that the payload 220 contains tamper resistance information unlike the description of an event as is the case with a typical event record. In addition, the metadata 215 includes information regarding the digital signatures used in creating the payload 220, such as the cryptographic type of digital signatures used.

In an example, the operating system 122 may associate the tamper resistance record 200 with a single event record, such as the event record 130a. For example, the header 210 may include a spatial reference of the event record 130a. The spatial reference may be a memory location of the event record 130a. Alternatively, or in addition, the spatial reference may be spatial relation between the tamper resistance record 200 and the corresponding event record 130a. For example, the spatial relation may be a predetermined relation based on the memory locations of the records. In such a case, the spatial reference of the first event record is implicitly identified based on the predetermined relation and the memory location of the second event record, thus, not avoiding explicitly saving a spatial reference in the tamper resistance record.

Thus, the spatial reference is either explicitly stored or it can be implicit. If it is explicit, the location of the first event record 130a is stored in the tamper resistance record 200. The location may be a location of the first event record in memory or in a file. When the spatial reference is implicit, it is with relation to the data in memory or a file. The system 100 may use a predetermined spatial relation between the first event record 130a and the tamper resistance record 200. For example, according to the predetermined spatial relation, the first event record 130a may precede the tamper resistance record 200 with no other records in between. Alternatively, the predetermined spatial relation permits other event records of that same type as the first event record 130a in between the first event record 130a and the tamper resistance record 200. In an example, the other event records cannot be included in the tamper resistant data, which is the payload 200, of the tamper resistance record 200.

In an example, the operating system 122 may associate the tamper resistance record 200 with more than one event record in the event record log 127, such as with the event records 130a through 130x. Accordingly, the header 210 may include spatial references to each event record that is associated with the tamper resistance record 200. Additionally, the header 210 or metadata 215 may include a number of event records that the tamper resistance record 200 is associated with and the length of each respective digital signature included in the payload 220. In an example, the operating system 122 may associate the tamper resistance record 200 with a predetermined number of successive event records in the event log 127. For example, the tamper resistance record 200 may be associated with 5 successive event records, or 10 successive event records, or any other predetermined number of event records. Alternatively, or in addition, the number of event records associated with the tamper resistance record 200 may be dynamically determined based on a number of event records stored in a predetermined memory range that the tamper resistance record 200 is associated with. The spatial reference in the header 210 may identify the memory range that is associated with the tamper resistance record 200.

In another example, the operating system 122 may associate the tamper resistance record 200 with events of a selected type, such as file type events, user type events, or any other type of events. For example, consider that the tamper resistance record 200 is associated with file type events. If the operating system 122 generates the event record 130a in response to a file type event, the operating system 122 may associate the event record 130a with the tamper resistance record 200. The header 210 of the tamper resistance record 200, in such a case, may indicate an identifier of the type of event records that are associated with the tamper resistance record 200. In the above example, the header 210 may include an identifier of the file type event. The operating system 122 may associate each file type event record with the tamper resistance record 200.

In yet another example, the operating system 122 may associate the tamper resistance record 200 with a set of consecutive event records of the same type. The memory locations of the event records in the set of consecutive event records may precede the tamper resistance record 200 or vice versa. For example, in response to detecting two or more consecutive events of the same type, the operating system 122 may generate and associate the tamper resistance record 200 with the event records generated corresponding to the events. For example, the operating system 122 may generate a first event record 130a and a second event record 130b that are of the same type. In this case, the operating system 122 may generate the tamper resistance record 200 that is associated with the first event record 130a and the second event record 130b. In other examples, the tamper resistance record 200 may be associated with more than two event records of the same type.

In exemplary embodiments, the digital signatures in the tamper resistance records can be configured to cover only event record data or to cover data within the tamper resistance record, such as the metadata or header. As used herein, the term coverage means the data that is used to generate a digital signature. In other words, data that is used to generate a signature is covered, and data that is not used in the signature generation process is not covered or uncovered. When creating a second digital signature to be stored in the tamper resistance record, consideration must be given to the data that is covered by both signatures or only one of the signatures.

Figure 3A:
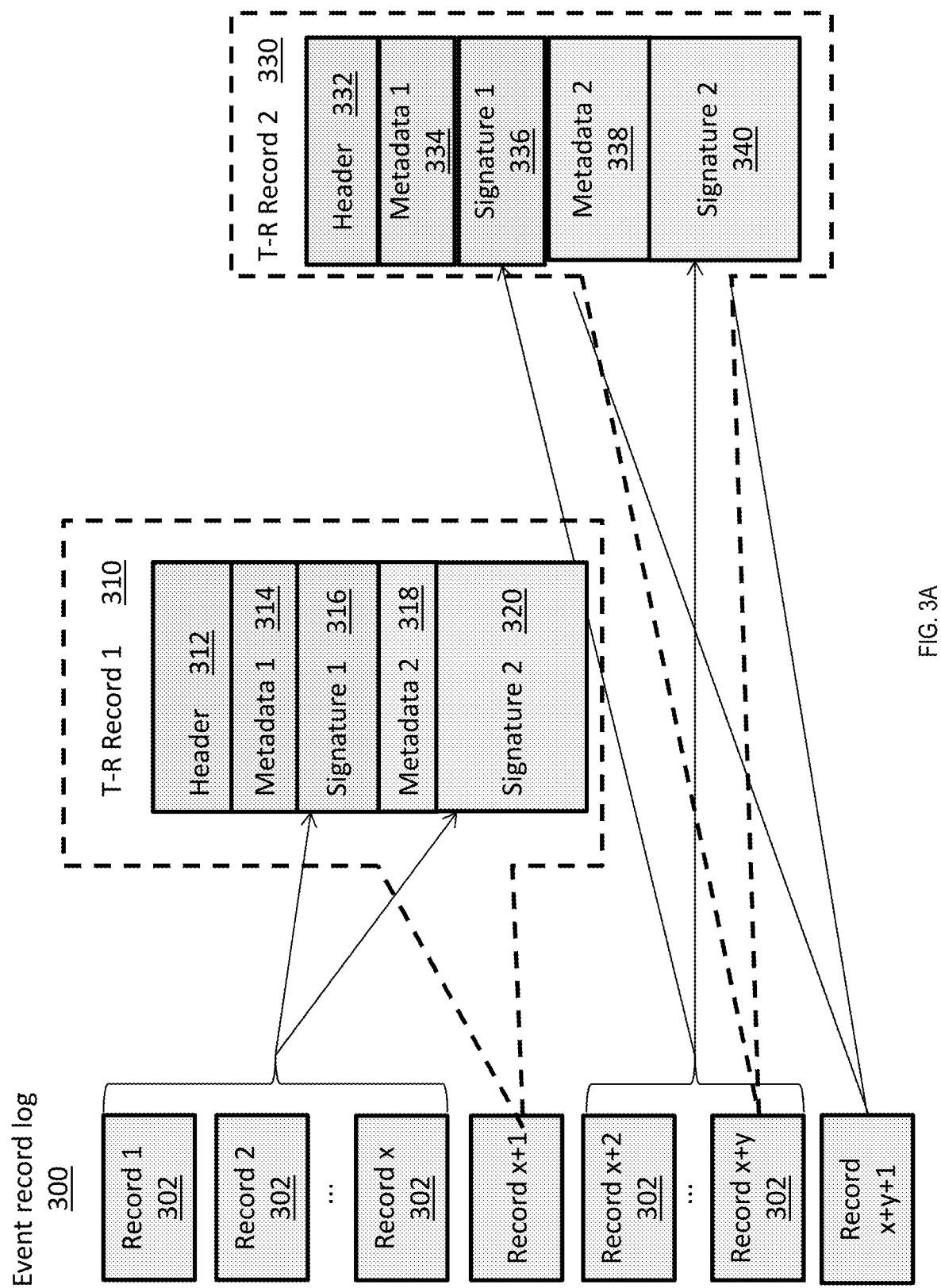
FIG. 3A illustrates an event record log including tamper resistance records having multiple signatures in accordance with an embodiment.

In one embodiment, such as the embodiment shown in FIG. 3A, the digital signatures in the tamper resistance record only covers event record data (i.e. no tamper resistance information is covered by the signature), there are no conflicts between the data covered by the two digital signatures and the signatures can be generated independently. In such embodiments, event records 1 to x are used to generate both signatures in tamper resistance record 310, and likewise with records x+2 to x+y for tamper resistance record 330.

Figure 3B:
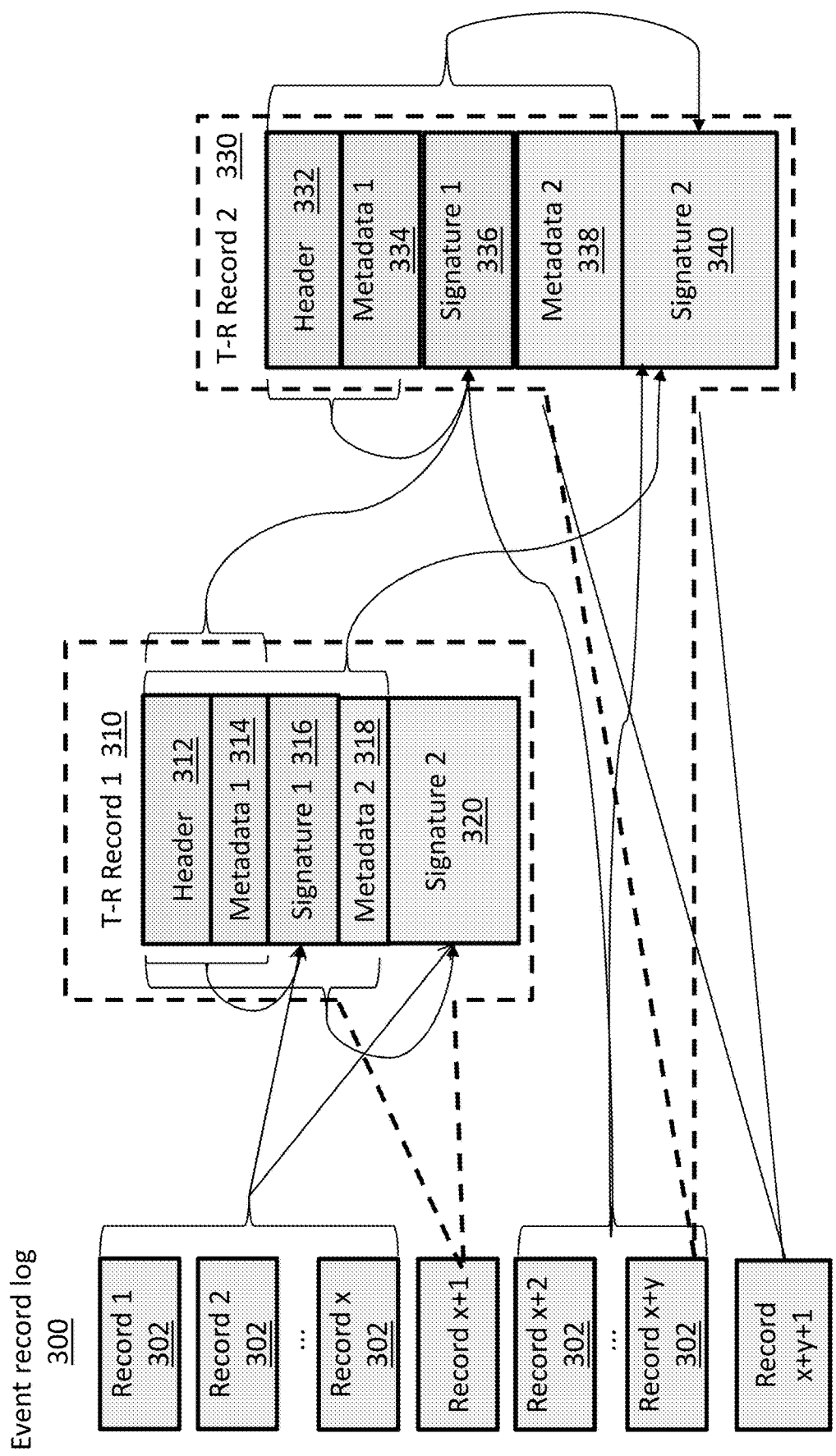
FIG. 3B illustrates an event record log including tamper resistance records having multiple signatures in accordance with another embodiment.

In other embodiments, such as the embodiment shown in FIG. 3B, the digital signatures in the tamper resistance record cover data in the current tamper resistance record, the problem is more complicated. There is often metadata that needs to be covered as part of the signature (for example, the cryptography method used to generate the signature) as shown in tamper resistance record 310.

In exemplary embodiments, subsequent tamper resistance records will often include information from the prior tamper resistance record in their digital signatures such that the digital signatures are chained together to ensure that records have not been added or deleted (such tamper resistance record 330). An example of pieces of data used from the prior tamper resistance record 330 are included in the new signature as shown in FIG. 3B. In these embodiments, during record validation, validation of the first signature does not guarantee that no tampering with the event log has occurred since it does not cover the information needed by the second signature. It is necessary to validate all of the signatures associated with the event log to verify that tampering has not occurred, although signatures can be validated individually.

Referring now to FIG. 3A, an event record log 300 including tamper resistance records having multiple signatures in accordance with an embodiment is shown. As illustrated, the event log 300 includes a plurality of event records 302, a first tamper resistance (T-R) record 310 and a second tamper resistance (T-R) record 330. As illustrated, the first T-R record 310 includes a header 312, metadata 314, a first signature 316, metadata 318 and a second signature 320. The header 312 includes a timestamp for the T-R record 310. The metadata 314 includes information used to create the first signature 316 such as a type of cryptography used, spatial information for the event records 302 used and the like. The first signature 316 includes the digital signature is created for the event records 302. Likewise, the metadata 318 includes information used to create the second signature 320 such as a type of cryptography used, spatial information for the event records 302 used and the like. The second signature 320 includes the digital signature is created for the event records 302. In exemplary embodiments, the type of cryptography used to create the first signature 316 and the second signature 320 are different.

The second T-R record 330 includes a header 332, metadata 334, a first signature 336, metadata 338 and a second signature 340. The header 332 includes a timestamp for the T-R record 330. The metadata 334 includes information used to create the first signature 336 such as a type of cryptography used, spatial information for the event records 302 used and the like. The first signature 336 includes the digital signature is created for the event records 302. Likewise, the metadata 338 includes information used to create the second signature 340 such as a type of cryptography used, spatial information for the event records 302 used and the like. The second signature 340 includes the digital signature is created for the event records 302. In exemplary embodiments, the type of cryptography used to create the first signature 316 and the first signature 336 are the same and the type of cryptography used to create the second signature 320 and the second signature 340 are the same.

Referring now to FIG. 3B, an event record log 300 including tamper resistance records having multiple signatures in accordance with an embodiment is shown. Similar to the event log 300 shown in FIG. 3A, the event log 300 includes a plurality of event records 302, a first tamper resistance (T-R) record 310 and a second tamper resistance (T-R) record 330. In contrast, to the embodiment shown in FIG. 3A, the signatures 316, 320, 336 and 340 in the first T-R record 310 and the second T-R record 330 cover data other than the data in the event records 302. For example, as illustrated, signature 316 covers the data in event records 1 through event record x, header 312 and metadata 314. Likewise, the signature 320 covers the data in event records 1 through event record x, header 312, metadata 314, signature 316 and metadata 318. As will be appreciated by those of ordinary skill in the art, various combinations of which data fields are to be covered by each signature can be used.

Figure 4:
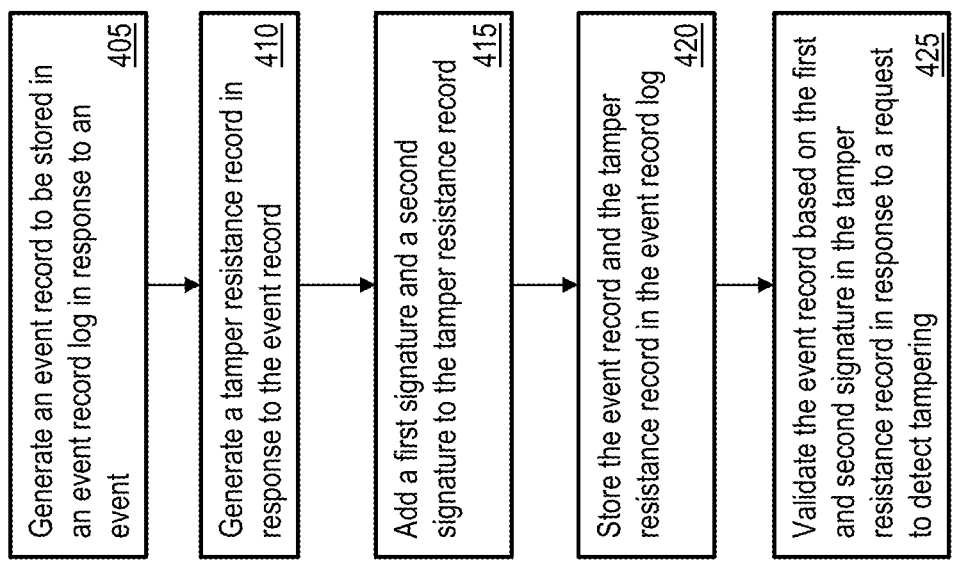
FIG. 4 illustrates a method of generating a tamper resistance record in accordance with an exemplary embodiment.

FIG. 4 illustrates a method of generating a tamper resistance record in accordance with an exemplary embodiment. The processor implements the method. The method includes generating, by the processor, an event record in response to an event, as shown at block 405. The processor detects occurrence of the event. For example, the processor may be configured to detect occurrence of a predetermined event type. In response to the occurrence of an event of the predetermined type, the processor may generate the event record. The processor generates a tamper resistance record in response to generation of the event record, as shown at block 410. Next, as shown at block 415, the processor adds a first signature and a second signature to the tamper resistance record. In exemplary embodiments, the first signature and the second signatures are created based at least in part on the event record and the first signature and the second signature are created using different cryptographic functions.

In exemplary embodiments, the tamper resistance record also includes a spatial reference of the event record, the spatial reference identifying a memory location of the first event record. In these embodiments, the first signature is created based at least in part on the event record and the spatial reference of the event record. In exemplary embodiments, the second signature is created based upon the event record, the first signature and the spatial reference of the event record. Once the processor adds the signatures to the tamper resistance record, the tamper resistance record is stored in the event record log, as shown at block 420. In response to a request to detect tampering of the first event record, the processor validates the first event record based on the first signature and the second signature in the first tamper resistance record, as shown at block 425.

In exemplary embodiments, the first tamper resistance record includes an identification of a type of the cryptographic functions used in creating the first signature and the second signature. The processor is further configured to generate a second event record in response to a second event being performed by the computer, the second event occurring after the first tamper resistance record is generated. The processor then generates a second tamper resistance record in response to the second event record being generated. The second tamper resistance record includes a third signature that is created based at least in part on the second event record and a fourth signature is created based at least in part on the second event record, wherein the first signature and the third signature are created using the same cryptographic functions and the second signature and the fourth signature are created using the same cryptographic functions. In exemplary embodiments, the third signature is created based at least in part on the second event record and at least part of the first tamper resistance record. The fourth signature is created based at least in part on the second event record, the third signature and at least part of the first tamper resistance record.

In exemplary embodiments, the event logging system is configured such that the use of a second or third digital signature can be selectively enabled or disabled, i.e., turned on and off. In exemplary embodiments, the enablement or disablement occurs on the boundary of the tamper resistance record by either delaying the enablement or disablement until a tamper resistant record is written, or immediately generating a tamper resistant record upon receipt an enablement or disablement request.

Figure 5:
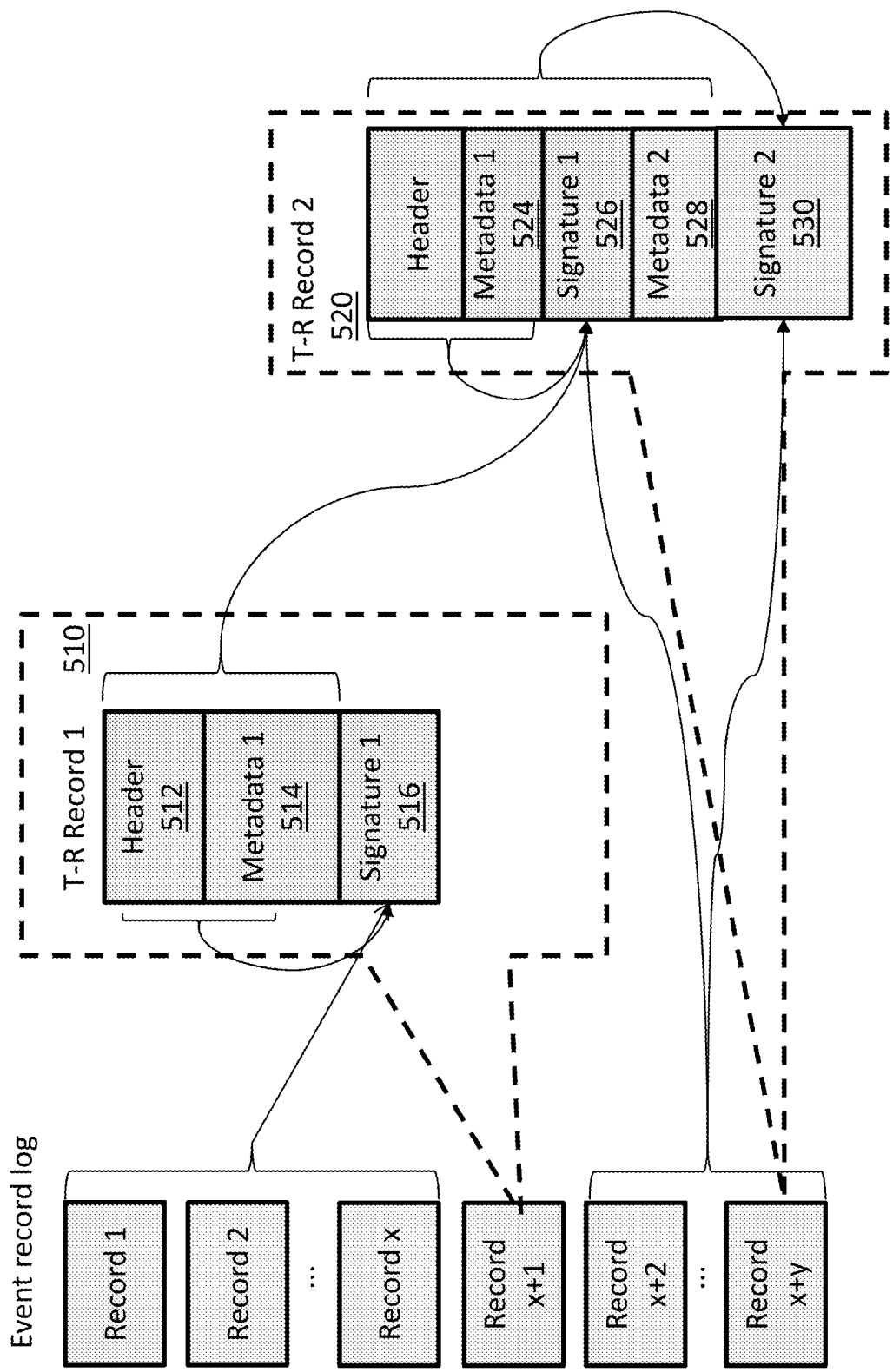
FIG. 5 illustrates the enablement of a tamper resistance record having multiple signatures in accordance with an embodiment.

FIG. 5 illustrates enablement of a tamper resistance record having multiple signatures in accordance with an embodiment. In exemplary embodiments, a request to enable the use of additional signatures is received after the tamper resistant record 510, including header 512, metadata 514 and signature 516, has been created. An indicator indicating an addition of a second signature is written into a metadata field 524 of the tamper resistant record 520 that indicates that the signature change is occurring. The metadata 524, including the indicator, will be covered by the signature 526 and optionally by signature 530. Each digital signature metadata 524, 528 is stored in the tamper resistance record 520 and each signature 526 and 530 is generated, starting with the first signature until the tamper resistance record 520 is built. In the case of enablement, the second signature can either not cover the prior tamper resistance record (i.e. no chaining to the prior record) or can cover some portion of the prior record (for example, the entire record or the same coverage as the primary signature.) If covering some portion of the prior record, not covering the prior record with the additional signature is sufficient, as the first signature will already cover the prior record.

Figure 6:
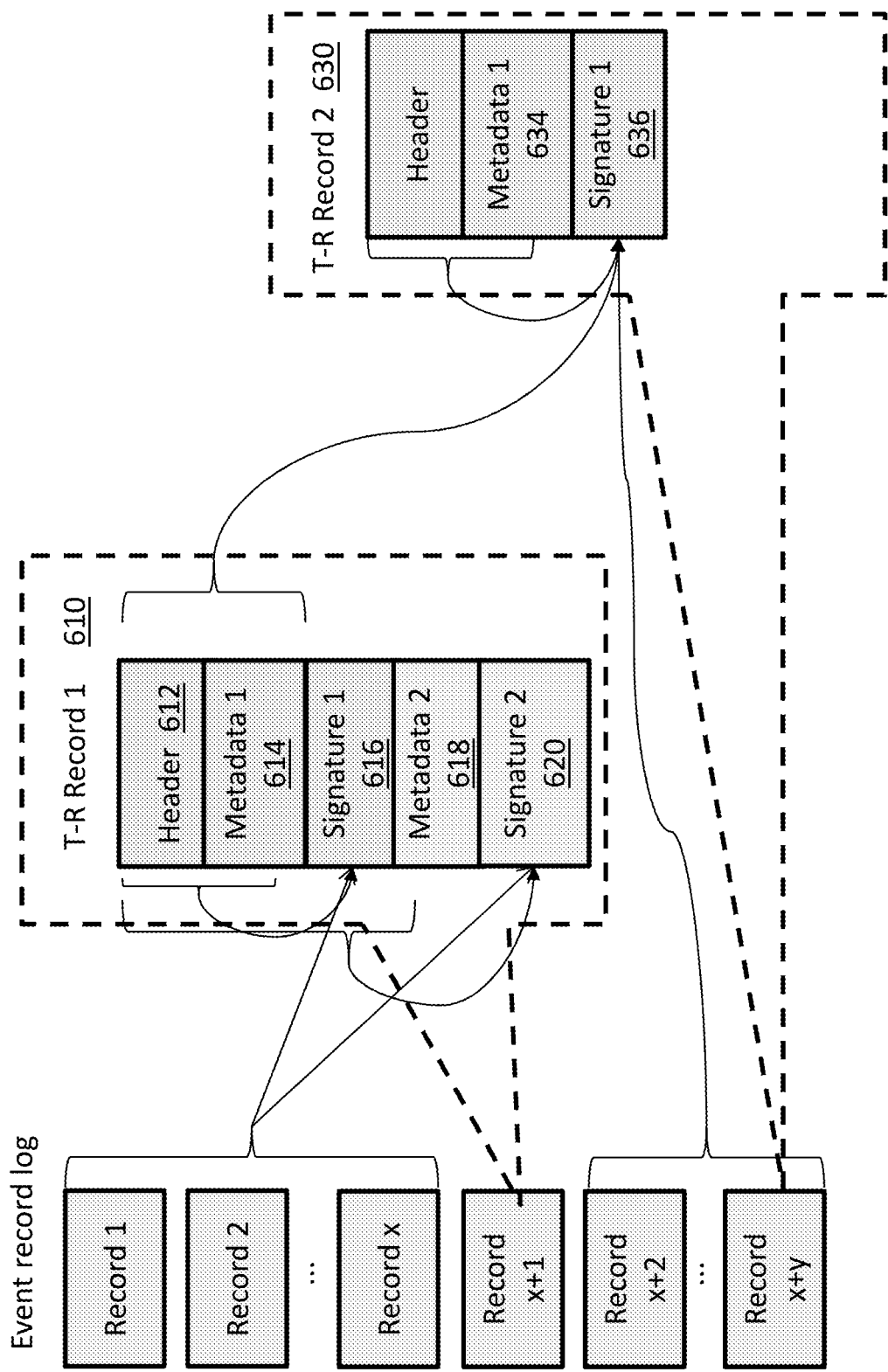
FIG. 6 illustrates the disablement of a tamper resistance record having multiple signatures in accordance with an embodiment.

FIG. 6 illustrates disablement of a tamper resistance record having multiple signatures in accordance with an embodiment. In exemplary embodiments, a request to disable the use of additional signatures is received after the tamper resistant record 610 including header 612, metadata 614, signature 616, metadata 618 and signature 620, has been created. An indicator indicating the removal of a second signature is written into a metadata field 634 of the tamper resistant record 630 that indicates that the signature change is occurring and that the tamper resistant record 630 will only include a single signature 636. In exemplary embodiments, chaining of records on the subsequent tamper resistant record can either include or not include the current tamper resistant record when signature options are enabled, disabled, or altered.

Validation of the tamper resistance records should verify that the metadata for each signature is consistent (i.e. the prior record and the current record have the same metadata), unless the signature change indicator is also set. Upon enablement, it should validate the digital signature using the same coverage as was used during record generation (i.e. if the prior record was not covered using the secondary signature, the validation should assume that when calculating the running hash.) This is in addition to any other tests that are made during validation (time calculations, counts of records, etc.)

In exemplary embodiments, the processor may identify whether the event record is a tamper resistance record or a typical event record based on an identifier in the header 210 of the event record. The processor 110 may bypass, or ignore the tamper resistance record 200, such as unless the processor 110 is performing a regulatory compliance audit of the event record log 127. During the audit, the processor 110 identifies the tamper resistance record 200 for each respective event record that is to be analyzed. The processor 110 determines if the contents of the event record have been modified, or have been tampered with, by comparing the contents of the event record with the digital signatures in the payload 220 of the tamper resistance record 200. If the validity of the contents of the event record is not confirmed based on the comparison, the processor flags the event record in an audit report or in any other manner, such as by displaying an error, an audible note, or any other user notification. Alternatively, if the comparison confirms the validates the event record as being tamper free, the processor 110 continues to analyze the next event record and complete the audit report.

In the examples described throughout the present document, the processor 110 may associate the tamper resistance record 200 with the corresponding event record, without modifying the event record. Since, the event record continues to use the predetermined event record format, any existing infrastructure and/or applications to read and analyze the event record log may continue to operate without any changes. Accordingly, tamper resistance for regulatory compliance may be added to the existing infrastructure in an efficient manner, without incurring costs to modify existing processes.

Thus, the problem solved by the examples described throughout this application is the ability to insert tamper resistance in an existing event logging system while preserving existing workflows and software that uses the existing log data. The examples facilitate transporting digital signatures in the log data as additional logged data without modifying the data provided using existing log APIs. Accordingly, tamper resistance metadata may be integrated directly into an existing record log by providing tamper resistance metadata in the same format as other logged event records. This provides ease of use for compatibility with existing tooling as well as portability when moving logged event records. The tamper resistance information is transparently carried along with the logged event records. By using the technical solutions described throughout the present application, a logging platform may include tamper resistance data without impacting the core-functionality of the original platform.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The examples in the present document have been presented for purposes of illustration and description, and not intended to be exhaustive or limited to those in the form disclosed. Many modifications and variations will be apparent to those of ordinary skill in the art without departing from the scope and spirit of the present document. The examples were chosen and described in order to best explain the principles of the technical solutions and the practical application, and to enable others of ordinary skill in the art to understand the various examples with various modifications as are suited to the particular use contemplated.

The technical solutions may be implemented as a system, a method, and/or a computer program product. The computer program product may include a computer readable storage medium (or media) having computer readable program instructions thereon for causing a processor to carry out aspects of the technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the technical solutions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described throughout the present application.

Aspects of the present application are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples described throughout the present document. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples in the present document have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A computer implemented method for securing a log of one or more event records by adding tamper resistance to the log, the method comprising:
   generating, by a processor, a first event record in response to an event being performed by the computer;
   generating, by the processor, a first tamper resistance record in response to the first event record being generated, wherein the first tamper resistance record comprises:

a first signature that is created based at least in part on the first event record; and a second signature that is created based at least in part on the first event record and the first signature;

storing the first event record and the first tamper resistance record in the log;

in response to a request to detect tampering of the first event record, validating the first event record based on the first signature and the second signature in the first tamper resistance record;

generating, by the processor, a second event record in response to a second event being performed by the computer, the second event occurring after the first tamper resistance record is generated;

generating, by the processor, a second tamper resistance record in response to the second event record being generated, wherein the second tamper resistance record comprises:

a third signature that is created based at least in part on the second event record, wherein the third signature is created based at least in part on the second event record and at least part of the first tamper resistance record; and a fourth signature that is created based at least in part on the second event record, wherein the first signature and the third signature are created using the same cryptographic function and the second signature and the fourth signature are created using the same cryptographic function; and in response to a request to detect tampering of the second event record, validating the second event record based on the third signature and the fourth signature in the second tamper resistance record.

2. The computer implemented method of claim 1, wherein the first tamper resistance record further comprises an identification of a type of cryptographic function used in creating the first signature and the second signature.

3. The computer implemented method of claim 1, wherein the first tamper resistance record further comprises a spatial reference of the first event record, the spatial reference identifying the first event record.

4. The computer implemented method of claim 3, wherein the second signature is created based at least in part on the first event record, the spatial reference of the first event record and the first signature.

5. The computer implemented method of claim 1, wherein the fourth signature is created based at least in part on the second event record, the third signature and at least part of the first tamper resistance record.

6. The computer implemented method of claim 1, wherein the first signature and the second signature are created using different cryptographic function.

7. A system, comprising:
a memory; and
a hardware processor; wherein the hardware processor is configured to:
generate a first event record in response to an event being performed by the computer;
generate a first tamper resistance record in response to the first event record being generated, wherein the first tamper resistance record comprises:
a first signature that is created based at least in part on the first event record; and
a second signature that is created based at least in part on the first event record and the first signature;

store the first event record and the first tamper resistance record in a log of one or more event records; and in response to a request to detect tampering of the first event record, validate the first event record based on the first signature and the second signature in the first tamper resistance record;

generate a second event record in response to a second event being performed by the computer, the second event occurring after the first tamper resistance record is generated;

generate a second tamper resistance record in response to the second event record being generated, wherein the second tamper resistance record comprises:

a third signature that is created based at least in part on the second event record, wherein the third signature is created based at least in part on the second event record and at least part of the first tamper resistance record; and a fourth signature that is created based at least in part on the second event record, wherein the first signature and the third signature are created using the same cryptographic function and the second signature and the fourth signature are created using the same cryptographic function; and in response to a request to detect tampering of the second event record, validate the second event record based on the third signature and the fourth signature in the second tamper resistance record.

8. The system of claim 7, wherein the first tamper resistance record further comprises an identification of a type of cryptographic function used in creating the first signature and the second signature.

9. The system of claim 7, wherein the first tamper resistance record further comprises a spatial reference of the first event record, the spatial reference identifying the first event record.

10. The system of claim 9, wherein the second signature is created based at least in part on the first event record, the spatial reference of the first event record and the first signature.

11. The system of claim 7, wherein the fourth signature is created based at least in part on the second event record, the third signature and at least part of the first tamper resistance record.

12. The system of claim 7, wherein the first signature and the second signature are created using different cryptographic function.

13. A computer program product comprising a non-transitory computer readable storage medium having program instructions embodied therewith, the program instructions being executable by a processor to cause the processor to perform a method comprising:

generating a first event record in response to an event being performed by the computer;

generating a first tamper resistance record in response to the first event record being generated, wherein the first tamper resistance record comprises:

a first signature that is created based at least in part on the first event record; and a second signature that is created based at least in part on the first event record and the first signature;

storing the first event record and the first tamper resistance record in a log of one or more event records; and in response to a request to detect tampering of the first event record, validating the first event record based on the first signature and the second signature in the first tamper resistance record;

generating, by the processor, a second event record in response to a second event being performed by the computer, the second event occurring after the first tamper resistance record is generated;

generating, by the processor, a second tamper resistance record in response to the second event record being generated, wherein the second tamper resistance record comprises:
- a third signature that is created based at least in part on the second event record, wherein the third signature is created based at least in part on the second event record and at least part of the first tamper resistance record; and
- a fourth signature that is created based at least in part on the second event record, wherein the first signature and the third signature are created using the same cryptographic function and the second signature and the fourth signature are created using the same cryptographic function; and in response to a request to detect tampering of the second event record, validating the second event record based on the third signature and the fourth signature in the second tamper resistance record.

14. The computer program product of claim 13, wherein the first tamper resistance record further comprises an identification of a type of cryptographic function used in creating the first signature and the second signature.

15. The computer program product of claim 13, wherein the first tamper resistance record further comprises a spatial reference of the first event record, the spatial reference identifying a first event record.

16. The computer program product of claim 15, wherein the second signature is created based at least in part on the first event record, the spatial reference of the first event record and the first signature.

* * * * *